June 4, 1957 W. PALMER 2,794,979

MEANS FOR DETECTING IMPROPER SKY WAVE SYNCHRONIZATION

Filed May 24, 1952

INVENTOR
WINSLOW PALMER
BY James P. Malone
ATTORNEY 2,794,979

MEANS FOR DETECTING IMPROPER SKY WAVE SYNCHRONIZATION

Winslow Palmer, West Hempstead, N. Y., assignor to Sperry Rand Corporation, a corporation of Delaware Application May 24, 1952, Serial No. 289,790

11 Claims. (Cl. 343—103)

Figures 1, 2A, 2B, 2C, 2D, 2E, 2F:
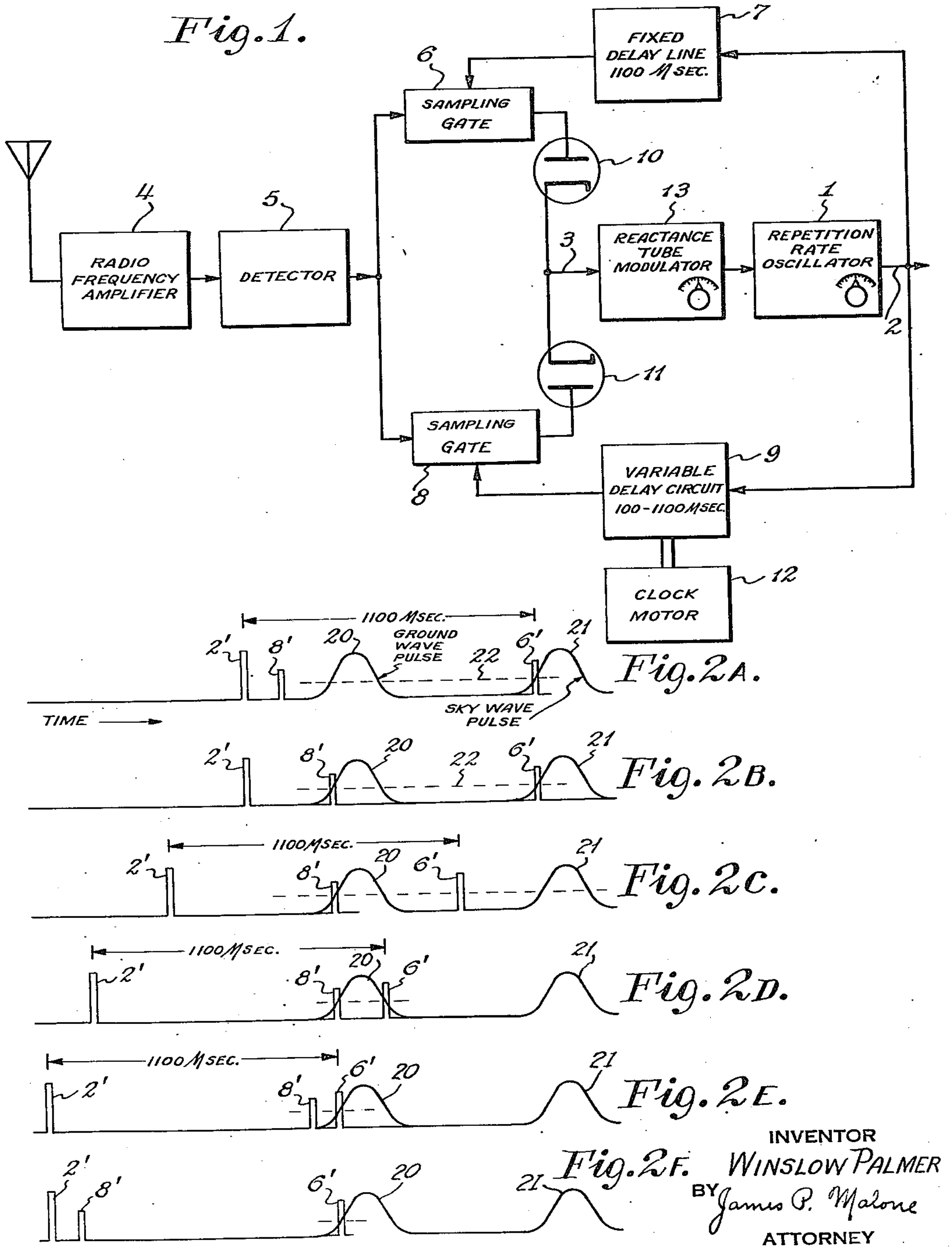

This invention relates to pulse synchronization systems and, more particularly, means for synchronizing on a received ground wave and avoiding improper sky wave synchronization.

In many pulse systems, for instance loran, a local oscillator is synchronized with received pulses. In such systems it is generally necessary or desirable to synchronize on the ground wave of the received pulse, and improper synchronization on a sky wave will cause an appreciable error in the time interval measurements. The sky waves are received strongly at certain times, especially at night. However, they are received from 50 to 1000 microseconds after the ground wave, and this fact may be utilized to ensure proper synchronization on the ground wave.

In the system of the present invention, the local oscillator is synchronized by a received pulse and a sampling pulse gate is scanned over approximately 1100 microseconds preceding the received synchronizing pulse. If the scanning gate detector detects another pulse, it indicates that the received synchronizing pulse is a sky wave, and corrective action is automatically undertaken.

Accordingly, a principal object of the invention is to provide new and improved means for avoiding sky wave synchronization.

Another object of the invention is to provide new and improved means for avoiding improper synchronization of a local oscillator.

Another object is to provide new and improved loran timing means.

Another object is to provide new and improved pulse synchronization means.

Another object is to provide new and improved means to synchronize a local oscillator with a received ground wave.

These and other objects of the invention are apparent from the following specification and figures, of which, Fig. 1 is a schematic block diagram of an embodiment of the invention; and Figs. 2A–2F are a group of wave forms illustrative of the operation of the invention.

Fig. 1 comprises generally a radio frequency amplifier 4, a detector 5 connected to the output of the amplifier, coincidence circuit means comprising a pair of sampling gates 6 and 8 connected to the output of the detector, a local oscillator 1 having approximately the repetition rate of the received signals, and a reactance tube modulator 13 adapted to control the frequency of the local oscillator 1. The sampling gate 6 is adapted to be triggered by the output of the local oscillator after a fixed time delay caused by a timing control circuit comprising fixed delay line 7. The second sampling gate 8 is adapted to be triggered by the output of the local oscillator 1 after a delay which is made continuously variable from 100 to 1100 microseconds after the output of oscillator 1 by means of a timing control circuit comprising variable delay circuit 9 which is driven by a clock motor 12. The sampling gates 6 and 8 detect received pulse amplitude when triggered.

The operation of the embodiment of Fig. 1 will be explained in connection with the wave forms of Fig. 2. Fig. 2A shows a ground wave received pulse 20 of a series of ground wave pulses recurring at a regular repetition rate and a first sky wave received pulse 21 of a series of recurrent sky wave pulses of the same repetition rate and delayed from the ground wave pulse series. The local oscillator 1 generates gate pulses on an output lead 2 having approximately the repetition rate of the received pulses, one of the gate pulses being indicated at 2′ in Fig. 2A. The sampling gate 6 providing pulse gate 6′ is triggered 1100 microseconds after the local oscillator pulse 2′. The local oscillator 1 is preferably adjusted to have a frequency slightly less than the received pulse repetition frequency so that the sampling pulse 6′ will gradually move towards the right, that is, it will approach the leading edge of the received pulses, i. e., ground wave pulse 20, or sky wave pulse 21. The reactance tube circuit 13 is adjusted so that when the sampling pulse 6′ samples a certain predetermined amplitude level, shown by dotted line 22, then the local oscillator 1 will be synchronized in frequency with the received pulses.

Fig. 2A shows the sampling pulse 6′ in this synchronized position. If the pulse 6′ were to move to the right relative to the received pulse, it would sample a greater amplitude which would apply a greater voltage to reactance tube 13 which would increase the frequency of the local oscillator and would tend to return the sampling pulse 6′ to the position shown in Fig. 2A. If the sampling pulse were to move to the left of the synchronized position, it would sample a lesser quantity and the reverse would take place. The diodes 10 and 11 connected to the outputs of the sampling gates serve to isolate the sampling gates 6 and 8 from each other.

Fig. 2A shows a sampling pulse 6′ synchronized on a sky wave pulse 21. This is an undesirable condition since it is desired to synchronize on the ground wave pulse 20. The second sampling pulse gate 8′, Fig. 2A, is continuously variable from 100 to 1100 microseconds after the local oscillator pulse 2′. The continuously variable means shown is a clock motor 12, but other equivalent periodic means could be used. The function of the clock motor 12 and the variable delay circuit 9 is to scan sampling pulse gate 8′ through approximately the 1000 microsecond period preceding the pulse gate 6′. Therefore, referring to Fig. 2B, as the pulse gate 8′ moves to the right, it will encounter the ground wave pulse 20. In the position shown in Fig. 2B, sampling pulse gates 8′ and 6′ are sampling equal amplitudes. However, the amplitude sampled by pulse gate 8′ will increase since it is being driven to the right by a continuously variable circuit 9. When the output of gate 8 becomes greater than the output of gate 6, diode 11 will begin to conduct, thereby raising the cathode potential of diode 10 above its plate potential so that diode 10 ceases to conduct, and control of the reactance tube modulator 13 is thereby shifted to sampling gate 8. As the delay of pulse gate 8′ continues to increase due to the operation of the clock motor 12, the pulse gate 8′ will move higher on the pulse 20, until the bias or signal applied to the reactance tube modulator 13 causes the frequency of the repetition rate oscillator to increase sufficiently to offset the rate of change of the delay put in by variable delay circuit 9, at which point the pulse gate 8′ will stabilize on the front edge of the pulse 20.

As the variable delay continues to increase, the higher repetition rate oscillator frequency will cause the local pulses 2′ and the sampling pulse gate 6′ to occur earlier, Fig. 2C, by an increasing amount relative to pulse 20, until sampling gate 6′ falls upon the trailing edge of pulse 20, as in Fig. 2D. When the interval between pulse gate 8′ and pulse gate 6′ has decreased to the point that pulse gate 6′ samples higher on the pulse 20 than the pulse gate 8′, diode 10 will again begin to conduct, and control of the reactance tube modulator will shift back to sampling gate 6. At this point, however, pulse gate 6′ is sampling the trailing edge of the pulse 20, which has negative slope, so that as the sampling pulse gate 6′ samples higher on the pulse, it further increases the frequency of the repetition rate oscillator 1, thereby causing the pulse gate 6′ to occur earlier, so that it shifts over and stabilizes on the leading edge of the pulse, which has positive slope. A pulse gate could never synchronize on the rear edge of a received pulse since that is an unstable condition as the frequency control is designed to operate on the front edge which has opposite slope.

As the sampling pulse gate 6′ goes to the front of the ground wave pulse 20, it momentarily displaces pulse 8′ to the left. However, due to the increasing variable delay, shortly thereafter the pulse gates 6′ and 8′ will coincide, i. e., they will each be 1100 microseconds behind the local pulse 2′. At this time, the continuously driven variable delay will abruptly change the sampling pulse gate 8′ to 100 microseconds behind the pulse 2′, and the scanning period will be repeated. If the sampling pulse 8′ encounters another pulse during the scanning period, the above process will be repeated. If it does not encounter another pulse, then it is evident that the sampling pulse gate 6′ is synchronized with the first received pulse, i. e., the ground wave, which is the desired condition. The discussion has been limited to a ground wave pulse and the first sky wave pulse thereafter. The invention applies as well to improper synchronization on succeeding sky wave pulses, the above steps being repeated until ground wave synchronization is obtained.

The sampling gate circuits 6 and 8 may be of the four-diode type disclosed in volume 31 of the Proceedings of the Institute of Radio Engineers, January 1943, page 12. Delay circuits 7 may comprise a conventional delay line or a multivibrator and delay circuit 9 may comprise a multivibrator or "phantastron" circuit. The output of the local oscillator on lead 2 may be used to synchronize deflecting circuits of the cathode ray indicator for making a time measurement, for instance, of a loran interval.

The invention is not limited to loran type systems. It may be used wherever it is desired to synchronize on a particular one of several waves which are received with approximately known intervals between and the sequence of which are known. The present invention is particularly advantageous for loran systems of the completely automatic type, for instance, as shown in my copending application S. N. 736,648, filed March 24, 1947, now Patent No. 2,683,873, granted July 13, 1954.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a pulse receiver for receiving pulses of radio frequency energy of a multiple pulse signal recurring at a regular repetition rate, a radio frequency amplifier, a detector connected to the output of said amplifier, first and second sampling gates connected to the output of said detector, a local oscillator having approximately the received pulse repetition rate, means to control the repetition frequency of said local oscillator, fixed delay means connected between the output of said oscillator and said first sampling gate, continuously variable delay means connected between the output of said oscillator and said second sampling gate, and means coupling the outputs of said first and second sampling gates to said frequency control means for varying the repetition frequency of said oscillator in accordance with the outputs of said sampling gates to thereby synchronize the output of said fixed delay means with the first pulse of the multiple pulse signal.

2. In a loran receiver for receiving recurrent pulses of radio frequency energy of multiple pulse signals comprising ground and sky wave pulses, a radio frequency amplifier, a detector connected to the output of said amplifier, first and second sampling gates connected to the output of said detector, a local oscillator having approximately the loran repetition rate, means to control the frequency of said local oscillator, fixed delay means connected between the output of said oscillator and said first sampling gate, continuously variable delay means connected between the output of said oscillator and said second sampling gate, and means coupling the outputs of said first and second sampling gates to said frequency control means for varying the repetition frequency of said oscillator in accordance with the outputs of said sampling gates to thereby synchronize the output of said fixed delay means with the ground wave pulses of the multiple pulse signals.

3. In a loran receiver including pulse detecting means, a system for providing a series of recurrent pulses synchronized in predetermined timing relationship to recurrent pulses received via direct-path wave propagation from a loran transmitting station as distinguished from relatively delayed pulses received therefrom by reflected-path propagation; said system comprising coincidence circuit means having input means coupled to the output of said detecting means, said coincidence circuit means also having output means and first and second timing control input circuits, a source of recurrent pulses of variable repetition frequency, means coupled to the output means of said coincidence circuit means and operatively coupled to said source of recurrent pulses for regulating the repetition frequency thereof according to the output of said coincidence circuit means, means responsive to the output of said source of recurrent pulses for supplying first and second control signals to said first and second timing control circuits, respectively, and means for regularly varying the timing of said second control signals with respect to said first control signals throughout a predetermined range of time-variation between a timing substantially ahead of said first signals and a timing substantially coincident with said first signals.

4. In a loran receiver including a radio signal amplifying and detecting means, a system for providing a series of recurrent pulses synchronized in predetermined timing relationship to the recurrent pulses received via direct-path wave propagation from a loran transmitting station as distinguished from the relatively delayed pulses received therefrom by reflected-path propagation; said system comprising first and second sampling gate units having respective input circuits connected to receive the detected pulse output of said detecting means, said sampling gate units also having respective output circuits and respective timing control circuits, a source of recurrent pulses of variable repetition frequency, means jointly responsive to the outputs of said first and second sampling gate units and operatively coupled to said source for regulating the repetition frequency thereof according to the prevailing output from one or both of said sampling gate units, means responsive to the output of said source for supplying first and second control signals to the respective timing control circuits of said sampling gate units, and means for regularly varying the timing of said second control signals with respect to said first control signals throughout a predetermined range of time-variation between a timing substantially ahead of said first signals and a timing substantially coincident with said first signals.

5. In a loran receiver, a system for providing a series of synchronized pulses as set forth in claim 4, wherein said source of recurrent pulses has a pulse repetition frequency lower than the repetition frequency of the received recurrent pulses in the absence of output of said repetition frequency regulating means, and said repetition frequency regulating means comprising means for increasing the repetition frequency of said source of recurrent pulses and thereby advancing the timing of said first and second control signals relative to the received pulses, the extent of increase of frequency being proportioned to the output from one or both of said sampling units.

6. A pulse synchronization system, comprising means for receiving a plurality of different series of recurrent pulses of electrical energy having substantially the same repetition rates and having time delay intervals between pulses of the different series, pulse generator means for producing a further series of recurrent pulses of electrical energy having a variable repetition rate, fixed delay means coupled to said generator means for receiving pulses therefrom and delaying the pulses by an amount at least as large as the maximum time delay interval between said different series of recurrent pulses, continually variable delay means coupled to said generator means for receiving pulses therefrom and delaying the pulses by a continually variable amount over a delay range which extends between a limit of the order of the delay produced by said fixed delay means and a lesser limit, said delay range being at least as large as the maximum time delay interval between pulses of different series of said plurality of different series of pulses, coincidence circuit means for receiving said plurality of different series of recurrent pulses, said coincidence circuit means being coupled to said fixed delay and to said variable delay means to be gated by the delayed pulses therefrom to produce control voltages during coincidence of pulses of said plurality of different series of received recurrent pulses and gating pulses from said fixed or from said variable delay means, and frequency control means coupled between said coincidence circuit means and said pulse generator means for receiving said control voltages and controlling the repetition rate of the further series of recurrent pulses produced by said generator means.

7. A pulse synchronization system as defined in claim 6, wherein said frequency control means includes first and second uni-directional current isolating means coupled to said coincidence circuit means for receiving the control voltages therefrom, said first and second uni-directional current means having a common output circuit for developing a direct current control voltage.

8. A pulse synchronization system as defined in claim 7, wherein said frequency control means further includes modulator means coupled between said generating means and said common output circuit of said first and second uni-directional current means for varying the repetition frequency of said generating means in accordance with variations in said direct current control voltage.

9. A pulse synchronization system as defined in claim 8, wherein said first and second uni-directional current isolating means comprise first and second diodes having their cathodes coupled together.

10. Pulse synchronizing means, comprising first and second gate circuits for receiving both a first and a second series of recurrent pulses of electrical energy, said first and second series of pulses having corresponding repetition frequencies and a time delay interval therebetween, oscillator means for producing a third series of recurrent pulses of electrical energy, said third series of pulses having a repetition frequency of the order of the frequency of said first and second series of pulses, means coupled to said oscillator means for controlling the pulse repetition frequency thereof, fixed delay means coupled to said oscillator means for receiving said third series of pulses and supplying first recurrent gating pulses to said first gate circuit, each of said first recurrent gating pulses being appreciably shorter in duration than each of the pulses of said first and second series of pulses and delayed from said third series of pulses by a predetermined amount, continually variable delay means coupled to said oscillator means for receiving said third series of pulses and supplying second recurrent gating pulses to said second gate circuit, each of said second recurrent gating pulses being appreciably shorter in duration than each of the pulses of said first and second series of pulses and delayed from said third series of pulses, the delay produced by said variable delay means being continually variable over a range which extends between a delay of the order of said predetermined delay produced by said fixed delay means and a delay less than that produced by said fixed delay means, said range being at least as large as the time delay interval between said first and second series of pulses, said first gate circuit comprising means for producing a voltage output representing a sample of said first or second series of pulses whenever portions of pulses thereof are coincident with said first gating pulses, said second gate circuit comprising means for producing a voltage output representing a sample of said first or second series of pulses whenever portions of pulses thereof are coincident with said second gating pulses, and means coupled to said first and second gate circuits for receiving the output voltages therefrom and supplying a variable control voltage to said frequency control means to thereby vary the repetition frequency of said local oscillator and synchronize the first gating pulses supplied to said first gate circuit from said fixed delay means with said first series of recurrent pulses received thereby.

11. A pulse synchronization system, comprising means for generating a series of recurrent uni-directional pulses of electrical energy having a variable repetition frequency, the time intervals between pulses being considerably longer than the time durations of said pulses, first delay means coupled to said generating means for receiving uni-directional pulses therefrom, said first delay means comprising means for delaying the pulses received thereby for a fixed length of time which is less than any of the time intervals between pulses, second delay means coupled to said generating means for receiving uni-directional pulses therefrom, said second delay means comprising continually variable means for delaying the pulses received thereby for varying lengths of time over a range which extends between a limit corresponding to the order of the time delay produced by said first delay means and a lesser limit, sampling gate means for receiving a first series of recurrent pulses and a second later occurring series of recurrent pulses having repetition frequencies of the order of the repetition frequency of said uni-directional pulses and pulse durations appreciably longer than the durations of said uni-directional pulses, said first and said second series of received recurrent pulses having a time delay interval therebetween which is no larger than the delay range over which said second delay means is variable, said sampling gate means being coupled to said first delay means for producing a gated output voltage during coincidence of a pulse of either of said first or second series of received recurrent pulses with a uni-directional pulse received from said first delay means, said sampling gate means being coupled to said second delay means for producing a gated output voltage during coincidence of a pulse of either of said first or second series of received recurrent pulses with a uni-directional pulse received from said second delay means, and frequency control means responsive to the gated output voltages of said sampling gate means for automatically varying the repetition frequency of said generating means to synchronize the gating pulses supplied to said sampling gate means from said first delay means with said first series of received recurrent pulses.

References Cited in the file of this patent

UNITED STATES PATENTS 2,497,513 Paine et al. ............ Feb. 14, 1950